(12) United States Patent
Lissauer et al.

(10) Patent No.: US 7,165,020 B2
(45) Date of Patent: Jan. 16, 2007

(54) MULTI-LANGUAGE PHRASE EDITOR AND METHOD THEREOF

(75) Inventors: George Lissauer, Los Angeles, CA (US); Victor Che Kwong, Los Angeles, CA (US); Jack Hsiung, Santa Monica, CA (US); Reid Kneeland, Winnetka, CA (US); Dilip Parekh, Los Angeles, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 619 days.

(21) Appl. No.: 10/234,901

(22) Filed: Sep. 4, 2002
(Under 37 CFR 1.47)

(65) Prior Publication Data
US 2003/0135358 A1 Jul. 17, 2003

Related U.S. Application Data

(63) Continuation-in-part of application No. 09/320,952, filed on May 27, 1999, now Pat. No. 6,466,900.

(60) Provisional application No. 60/087,377, filed on May 29, 1998.

(51) Int. Cl.
*G06F 17/28* (2006.01)
(52) U.S. Cl. .......................... 704/7; 707/536
(58) Field of Classification Search ............ None
See application file for complete search history.

(56) References Cited

U.S. PATENT DOCUMENTS

| | | | | |
|---|---|---|---|---|
| 4,949,302 A | * | 8/1990 | Arnold et al. | 707/200 |
| 5,148,541 A | * | 9/1992 | Lee et al. | 707/2 |
| 5,175,684 A | * | 12/1992 | Chong | 704/3 |
| 5,375,164 A | * | 12/1994 | Jennings | 379/88.05 |
| 5,442,782 A | * | 8/1995 | Malatesta et al. | 707/4 |
| 5,583,761 A | * | 12/1996 | Chou | 715/536 |
| 5,640,575 A | * | 6/1997 | Maruyama et al. | 704/4 |
| 5,677,835 A | * | 10/1997 | Carbonell et al. | 704/8 |
| 5,787,385 A | * | 7/1998 | Tognazzini | 702/3 |
| 5,794,218 A | * | 8/1998 | Jennings et al. | 705/35 |
| 5,835,912 A | * | 11/1998 | Pet | 707/104.1 |
| 5,900,871 A | * | 5/1999 | Atkin et al. | 715/866 |
| 6,466,900 B1 | * | 10/2002 | Lissauer et al. | 704/7 |

FOREIGN PATENT DOCUMENTS

WO    WO 9521529 A1 *  8/1995

* cited by examiner

*Primary Examiner*—Tālivaldis Ivars Smits
*Assistant Examiner*—Eric Yen
(74) *Attorney, Agent, or Firm*—George T. Marcou; Kilpatrick Stockton LLP

(57) ABSTRACT

A method and system is provided for making a database stored upon a computer readable medium for use as a computerized multilingual phrase database in a runtime application environment. A database of all application phrases is created in one language with variable place holders reserved in the application phrases for each variable in the phrases. Translations of the created application phrases are created and stored in at least a second phrase database. The first and second phrase databases are exported in a form that can be used in a runtime environment by an application for which the first database and the second database were created.

38 Claims, 16 Drawing Sheets

| Language | Country |
|---|---|
| Chinese | Hong Kong, Singapore, and Taiwan |
| Dutch | Belgium |
| German | Germany |
| Greek | Greece |
| English | United Kingdom and United States |
| French | France |
| Italian | Italy |
| Korean | Korea |
| Catalan | Spain |
| Spanish | Chile and Spain |
| Japanese | Japan |

| Variable | Type | Value Storage |
|---|---|---|
| Currency | Currency | Values are not stored in the database. |
| Date | Date | Values are not stored in the database. |
| Dynamic | Text | Values are not stored in the database. |
| String | Text | Runtime values are stored in the database identified by a variable name and a string value ID. String values vary by language, device, and medium. |
| Time | Time | Values are not stored in the database. |

*FIG. 7*

| Variable | Token |
|---|---|
| Currency | {\ta} |
| Date | {\tc} |
| Dynamic | {\td} |
| String | {\ts} |
| Time | {\tt} |

*FIG. 8*

| Window | Use |
|---|---|
| Display Options | Configure the display of the Phrases and Strings windows |
| Edit | Create or edit Phrases or Strings |
| Phrases | View, edit, select, or delete Phrases |
| Scroll and Sort | Navigate and select which Phrases and Strings are displayed |
| Strings | View, edit, select, or delete Strings |
| Variables | Create variables |

*FIG. 9*

| String Value ID | String |
|---|---|
| 1 | Checking |
| 4 | Savings |
| 103 | CashPlus |

*FIG. 10*

| Variables | | | |
|---|---|---|---|
| Type | Name | Strg Use | Comment |
| Dynamic | AccountIdentifier | - | Variable filled in at runtime with string used to identify |
| String | CIN | 1 | Name used to identify the customer identification |
| Dynamic | CINVar | - | Variable filled in at runtime with value of CIN |
| String | CountryName | 3 | Name of country for display. Varies by Country Code. |
| Currency | Currency | - | Variable to contain currency value. |
| String | CustomerServiceText | 1 | Sentence used to tell customer to call customer service. |
| Date | Date | - | Variable to contain date value. |
| String | DatePrefix | 8 | Descriptive text displayed before a date that describes |
| Dynamic | DynamicVar | - | generic dynamic variable |
| String | FeeDescriptor | 1 | Name used to describe fee associated with specific |
| String | LogonIDType | 2 | Name of the Logon ID that can be used for Logon |
| String | Month | 12 | Name of Month |
| String | NegBalanceText | 185 | Descriptive text with balance or date. Varies by |
| String | PeriodDescPlural | 4 | Values can be "days", "months", etc. |
| String | PeriodDescSingular | 4 | Values can be "day", "month", etc. |
| String | PIN | 1 | Name of Personal Identification Number |
| String | PosBalanceSuffix | 10 | Descriptive text displayed after a balance that will be |
| String | PosBalanceText | 188 | Descriptive text with balance or date. Varies by |
| String | PrintRecordDisclaimer | 1 | Disclaimer displayed in the print record header. Varies |

Editing: CustomerServiceText

Type: String
Variable Name: CustomerServiceText
Comment: Sentence used to tell customer to call customer

[Clear] [Update] [Delete] [Sort] [Refresh] [Close] [Help]

*FIG. 13*

MULTI-LANGUAGE PHRASE EDITOR AND METHOD THEREOF

CROSS-REFERENCE TO RELATED APPLICATIONS

This application is a continuation-in-part application of application Ser. No. 09/320,952 filed May 27, 1999 now U.S. Pat. No. 6,466,900, which claims priority to Provisional Application Ser. No. 60/087,377 filed May 29, 1998 of the same inventors herein, and the disclosures of both are specifically incorporated by reference herein. This application claims priority to the filing dates of both application Ser. No. 09/320,952 filed May 27, 1999 and to the filing date of Provisional Application Ser. No. 60/087,377 filed May 29, 1998.

BACKGROUND OF THE INVENTION

This invention relates to a method for making a database stored upon a computer readable medium used with a computer for use as a computerized multilingual phrase database in a runtime application environment for translating words, phrases, and variables into words. In another more specific aspect, the invention relates to a database system for use with a computer as a multilingual phrase database in a runtime application environment for translating words, phrases, and variables into other languages.

In the design of software applications, for example, software applications written in the English language, it is desirable to also have such applications run in another language, such as French and Spanish. One prior art approach to accomplishing this was through the use of a resource file in connection with applications employing Microsoft Windows® based technology. Specifically, when using a resource file, all the phrases are listed in English for one application and another resource file lists all the phrases in the other language. This is typically similar to a manual operation. In using the resource files, you actually have to create a separate resource file for each project, and then merge them together. The merging somewhat automates the procedure but is incapable of handling graphics, and audio files as may be necessary for the particular application.

Another prior art approach involves a system and method for internationalizing a database application by providing a capability to create and maintain international records. Data items are stored in a base language with accompanying related copies of the data items represented in multiple languages and/or currencies. Application users then specify a preferred language and when the user's language preference is not the same as the base language, language dependent data items are retrieved from the related language records. Another prior art approach involves the use of a multilingual database system in which data can be searched and retrieved by a user whether or not that data is in the user's own language. More specifically, the prior art method and operation provides for a multilingual ordered database in which access to the data is facilitated by receiving information in the form of words based upon a multilingual alphabet, to be stored in the database. The words are encoded according to a predetermined criteria to form one sort key for each language to be supported by the database, and the information is stored in a known location in the datastore, with the sort keys being stored in a sorted order in the index along with an indication of the known location of the corresponding information in the datastore.

All of these prior art systems are complex, often require extensive manual manipulation of language phrases and do not provide for a simple, automated and effective manner of having an application use a database to present information in whatever language is required without being constrained by the language in which the application was written.

SUMMARY OF THE INVENTION

Thus, in one aspect, the invention is directed to a method of creating a multi-language database which allows the design of applications where a language translation can be created in one language and translations can be added in a different language for the purpose of developing applications that can run in many different languages.

More specifically, in one aspect, the invention relates to a method for making a database stored upon a computer readable medium used with the computer for use as a computerized multilingual phrase database and a runtime application environment, for translating words, phrases, and variables into words, phrases and variables into at least a second language. The method includes the steps of creating all application phrases in one language. A variable place holder is reserved in the application phrase for each variable in the phrases, and the application phrases are stored in one language in a phrases database. Translations of the phrases are then created in at least one other language and stored in the same database. The phrase databases are then exported in a form that can be used in a runtime environment by an application for which the databases were created.

In a second aspect, the invention relates to a database system for use with a computer as a multilingual phrase database in a runtime application environment. The database is used for translating words, phrases, and variables into words, phrases and variables in at least a second language. The database system includes a database created and stored which includes all application phrases in one language, and variable place holders in each phrase which requires a variable. The database also includes translations of the application phrases in another language. The phrase databases are then exported in a form that can be used in a runtime environment by an application for which the databases were created.

BRIEF DESCRIPTION OF THE DRAWINGS

Having thus briefly described the invention, the same will become better understood from the following detailed discussion, taken in conjunction with the attached drawings wherein:

FIG. 7 is a table showing the types of variables and information related to value storage as implemented in the system in accordance with the invention;

FIG. 8 is a table listing the types of variables and corresponding tokens that the system according to the invention supports;

FIG. 9 is a table illustrating the major windows and their corresponding use in the graphical implementation of the system according to the invention;

FIG. 10 is a table illustrating how a variable identified in the database is identified by a string value ID;

FIG. 13 illustrates a variables window which is used to create variables;

DETAILED DISCUSSION OF THE INVENTION

Figures 1, 2:
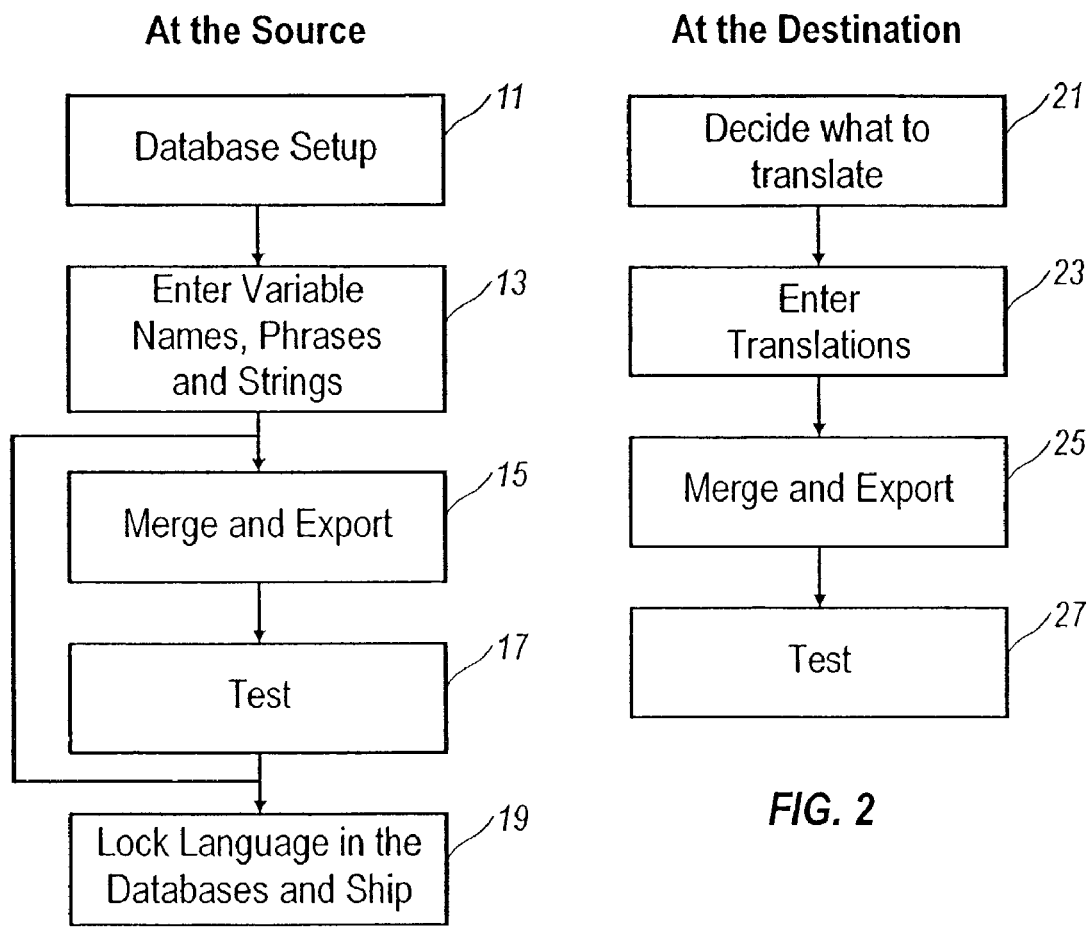
FIG. 1 is a flow diagram showing creation of the first database at the source.
FIG. 2 is a flow diagram showing adding the translations to the databases at the destination.

In accordance with the invention, there is provided a database system and method for creating the database as a tool to provide for the easy development of multilingual phrase databases used in various software applications. Specifically, the system and method in accordance with the invention simplifies internationalization and localization of applications which are used in various different locales where the native languages are different.

In a preferred aspect, the system is developed as a Microsoft Corporation Windows® based tool. Typical hardware requirements include a personal computer with an Intel 486™ processor or higher. System memory requirements include at least 32 megabytes of random access memory (RAM), and hard disk storage of 50 megabytes. A CD-ROM drive is required. Screen resolution of 800×600, preferably small fonts, is also required.

Software requirements include a Microsoft Windows® NT platform running Microsoft Windows® NT 4.0 with Service Pack 3, or Windows95™ with Service Pack 1.0. It is not required that Microsoft Visual Basic® be installed on the personal computer prior to installation of the database and system. Alternatively, a Microsoft Windows® 2000 operating system may be employed in lieu of the Windows® NT operating system.

Having thus described system requirements, the invention is hereafter described. In general, in creating the database, a phrase name will be specified for each phrase. Once the phrase is entered in one language, device, or media, a translation is entered for that phrase in a different language, device, or media in the database using the same phrase name. The system allows selection of which languages are supported, for example, as shown in illustrative and non-comprehensive form in the table of FIG. 6. More specifically, in the system the languages supported are all those supported by the Microsoft Windows® NT operating system or the Windows® 2000 operating system.

In accordance with the system and method, in addition to phrases that contain text only, the phrases can contain variables such as date, time, currency and text strings. This type of phrase is known as a "composite phrase" and with the variables in the phrase, a phrase can be modified dynamically when the application runs. After the variable names are defined, they can be inserted into a phrase.

In general, the actual values of the variables are supplied by the application at runtime, except for the text strings. Since strings are language specific, they are stored in the phrase database as well. Each string is associated with a variable name that has a unique string value ID.

The system supports string, dynamic, currency, date, and time variables. A variable token associated with each variable is inserted in a phrase and is later replaced by an actual value at runtime. The variable types and information related to the value storage are summarized in the exemplary table shown in FIG. 7. The variable name used in the composite phrase that used the variable is stored in the database. All variable names are stored in the database in the base language, for example, English.

In the system of the invention, a composite phrase contains variable placeholders. A placeholder consists of a variable token and a variable name. The types of variables and corresponding tokens that are supported by the system are illustrated in an exemplary manner in the table of FIG. 8. In addition to text, phrases can consists of graphic-image files. These phrases are multimedia phrases. To display graphic images, the phrase medium/format is first defined as Graphics/GIF or Graphics/JPG. This is done in a conventional manner well known to those of ordinary skill in the art. The system does not store graphic images. It only stores the path and file name of the image file. Similarly, the system can present the translated phrases in audio or other multimedia.

The system supports the concept of a presentation device. The devices supported include, for example, CAT, HomePC and SmartPhone. On these types of devices, each phrase may be presented with a different content based on the different type of presentation device. For example, a "Hello, may I help you" phrase on a CAT may be a "Hello" on a SmartPhone because its screen display is smaller. The database on the system is configured to support various devices by using the "Define" menu as discussed hereinafter. Specifically, the database system includes a means, i.e., a utility for creating a translation in the same language as the first language for supporting and displaying translated phrases on display devices having differing display capabilities.

In the context of the invention, by the term "phrase," is meant simple text, text with variables, or a reference to a media file. A phrase name may have multiple records in the database for example, one for each language, device, and medium. For example, if the database is configured for three languages, three devices and three media, each phrase can have as many as twenty-seven records. The database is used to create all application phrases in English and the phrases are stored in the database as they are created. Translations are then created, for example, by a human translator that knows both English and the language for which the translation is created, and an equivalent translated phrase is created for each English phrase. The translated phrases are also stored in the database as they are created. When all phrases are translated into the required languages, the database is then exported in a form that can be used by the application with which the database is to be used. Information is saved in the database as it is entered, with the system having been configured so that save operations are not required.

The system and method described herein can be employed with many different languages, each language having its own unique character set. In order to accommodate and handle the different languages, the system runs in a "localized" version of Microsoft Windows® NT or Windows® 2000 that support the particular language. For example, in order to use English, the system can run on the "English" version of Windows®, however, in order to use Chinese, Korean, Arabic text, etc., the system must run on a Chinese, Korean, Arabic, etc. version of Windows®. This is generally referred to herein as entering text in the "native" format as the input text is encoded according to the localized Windows® version.

Text is stored from all different language native encodings in a "universal format" called UTF-7, which is well known to those of ordinary skill in the art. UTF-7 is a 7-bit representation of Unicode.

Applications that use text stored by the system require that the text be encoded in either native format or UTF-8 format. The system provides an "export" functionality that converts the internal UTF-format text into either native format or UTF-8 format for exporting and use in a run time environment with an application as described hereafter.

Once a database is created, it has to be exported before it can be used in a runtime environment with a application. A conventional export operation is used which converts the phrases from Unicode encoding to a Microsoft Windows® code page. The exported phrases can then be rendered in a localized version of a Microsoft Windows® system. Thus, for example, in operation when Chinese text is entered, the text is stored in the database in Unicode format. The export operation converts it into Windows® code page 950, commonly referred to as Big5. Once the text is converted, it can be displayed on any client personal computer with Chinese Windows® (or any other localized version of Windows®), as long as the browser used supports Big5 encoding. The export operation can also convert the text into UTF-8 format so that it can be displayed on any browser.

Native format is used for applications that will run directly on a localized version of Windows®. For example, if the application is to run on Chinese Windows®, the Chinese phrases will be exported from the phrase database in the Chinese Windows® format. The Chinese Windows® application will not be able to display characters in other languages, such as Arabic or Korean, that are not supported by Chinese Windows®.

With respect to "web browser" applications, UTF-8 format can be used. Both Microsoft Internet Explorer® and Netscape Navigator® browsers support the UTF-8 format. UTF-8-enabled browsers can display text in many different languages independent of the localized version of Windows® that they are running on. Phrases can be exported from the phrase database in UTF-8 format. These phrases can be in any language and will display correctly on any UTF-8-enabled browser.

Figure 22:
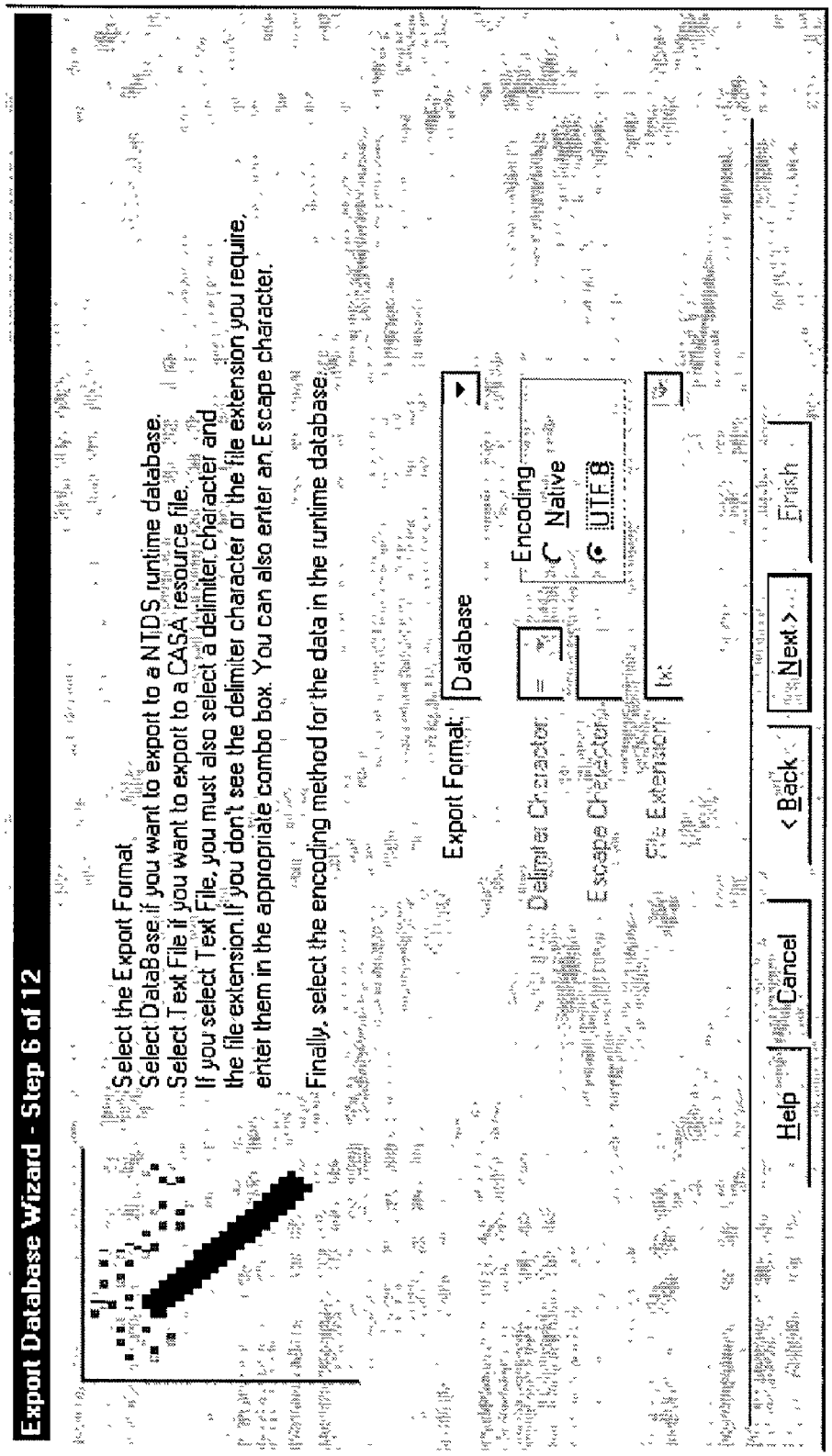
FIG. 22 is a screen shot illustrating how export encoding format can be selected in the system described herein.

Thus, the system includes an export utility which is used to interactively export phrases. FIG. 22 illustrates a screen showing the step where the export encoding format, either native or UTF-8, is selected. The system supports this functionality also in a batch export program.

The major windows that can be used are, for example, illustrated in FIG. 9. The system uses MDI windows that can be closed and opened independent of each other. Thus, for example, when a phrase database is opened, the Scroll and Sort, Strings, Phrases, and Edit MDI windows are opened. Only the Scroll and Sort, and the Phrase windows are displayed on the screen. The other two windows are open and displayed behind the two currently displayed windows.

Having generally discussed certain aspects of the invention, the following discussion addresses the actual phrase database creation and deployment. Before entering phrases in the database, several decisions that impact on how the databases are created, how they are used by applications and how they are deployed must be made. Since most applications typically consist of several mini applications ("mini-apps"), it is advisable to have one phrase database per mini-app. In this manner, each mini-app can be deployed independently. In addition, this makes maintenance of the databases easier. On the other hand, with one database per mini-app, there could be a lot of phrase duplication among databases if there are a lot of common phrases. In order to avoid this, a separate database of common phrases can be created. The phrase names used in such a database must be unique and different from those used in the databases specific to the respective mini-apps.

Figure 3:
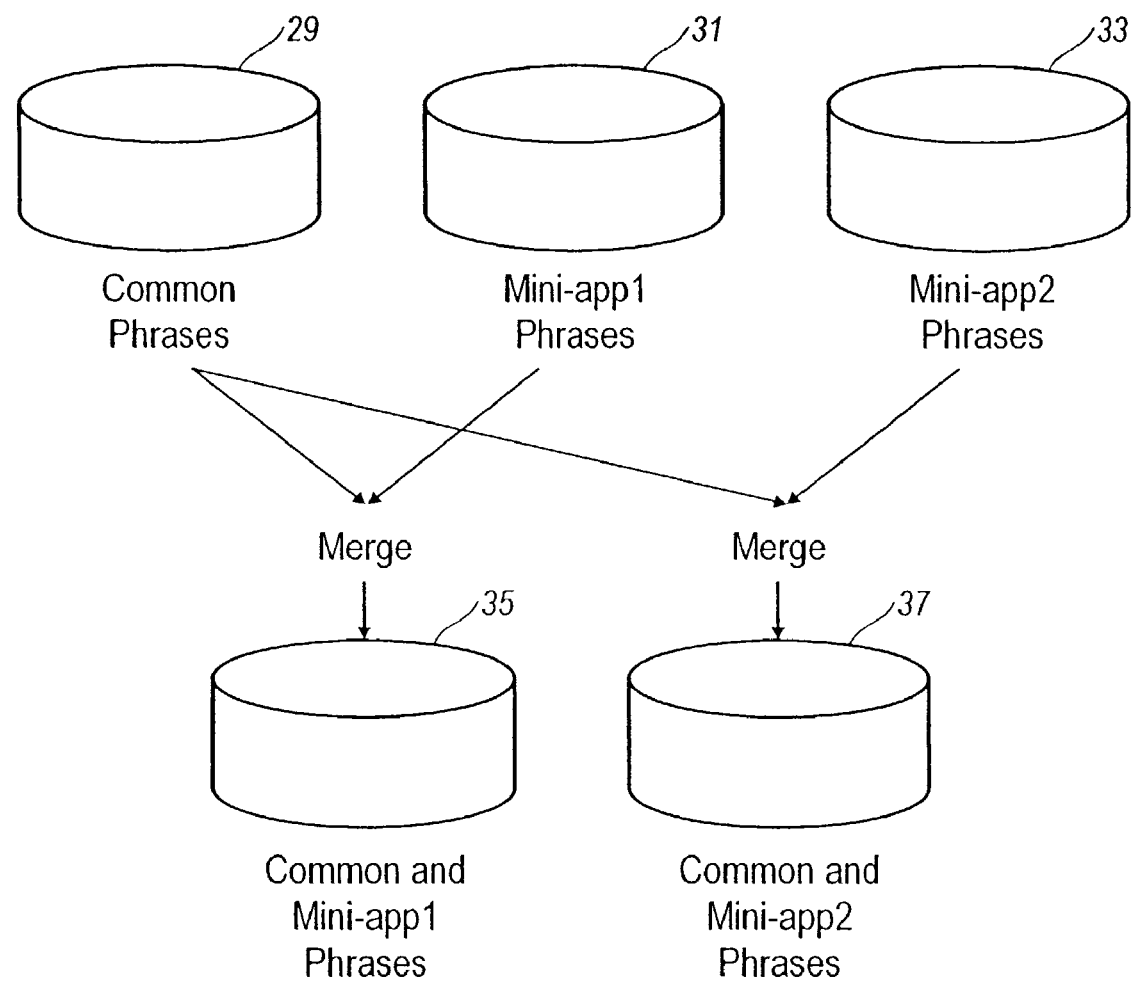
FIG. 3 is a schematic diagram illustrating how databases can be created for common phrases, with separate databases being created for use specifically with individual applications so that the respective databases can be merged and used by the different applications and thereby eliminate redundancy in the creation of databases.

In order to ensure that each mini-app has access to all the phrases required at runtime, a merge utility is used to merge each application-specific database with the common-phrase database for runtime use. Thus, as illustrated in FIG. 3, a common phrase database 29 can be merged with a mini-app database 31 to result in a merged mini-app database 35. This can be done for other mini-apps which require a separate mini-app database 33 which also can be merged with the common phrase database 29 to result in a merged database 37 used by the second mini-app.

The actual creation of the databases is better illustrated in FIGS. 1 and 2. The steps shown in the figures assume that the databases are originally created in one language at the source location and shipped for translations at various destinations. Thus, in accordance with the flow diagram of FIG. 1, the database is created at a step 11. Variables, names, phrases and strings are then entered at a step 13 and the resultant database is merged and exported at step 15. At this point, the database is tested in a runtime environment at step 17 and if testing is successful, the database is then locked and shipped at step 19.

As shown in FIG. 2, at the destination where translations are required, a decision is made with respect to what phrases to translate at step 21. Translations are entered at step 23, and the translation database is merged and exported at step 25 for testing at step 27.

After the new database is created, defined menu options are used to do the initial setup. Information is entered about the application that will use the database and the Version Control Language is specified. The languages for the database are selected and for each language a font is selected. Business names and codes are then entered and local and target paths for graphic files are also entered.

Thereafter, preferably the Version Control language is set before any phrases and strings are entered. Variable names, phrases and strings are then entered by selecting an appropriate screen by using the View Menu. In order to enter a phrase with text only, a phrase name is needed. For phrases with variables, the variable names must be entered. For strings, the variable names are required as well as the string value IDs, and optionally, business codes, for example, as illustrated in FIG. 10. As the database is created, comments can be included, for example, to explain the context of a phrase.

With respect to the merging and exporting step 15 of FIG. 1, once the variable names, phrases, and strings in the database are entered, the database will need to be merged and exported. A merge utility specifically designed for the phrase databases allows merging of the databases together. An export utility specifically designed for the phrase databases allows creation of a runtime database. In any event, any merging which is to be done should always occur before export.

After exporting the database, the database is tested at step 17 shown in FIG. 1. To conduct the testing, the databases are copied to an appropriate location on a server. Graphics files are copied to a target path specified in the database. During testing, a check is made to ensure that the phrase text/graphics displayed corresponds to the phrase names specified.

In addition, during testing, it must be insured that variable names are substituted with the value specified and are in the correct order. Further, testing must insure that currency, date, and time are displayed in the expected format.

In step 19, after testing, the source databases are prepared for shipment to the destination. The initial language used for translation may be "locked." This prevents accidental modification of the phrases and strings in this language.

Thereafter, the database is shipped for translation as illustrated in FIG. 2. The source databases are shipped, i.e., the common and application specific ones, for example, as illustrated in FIG. 3, and not the merged or exported ones, to those making the translation. In addition, as noted previously, graphics files must be shipped and the local path for those files must be specified.

At the destination, a decision is made as to what to translate. In order to fetch the phrases at runtime, the language name is used as one of the keys. This requires that all the phrases are translated in each language to be supported in the database. For languages that are different from each other, for example, English and Spanish, each English phrase will have to translated. The system includes means for creating user defined languages. For example, if the user wanted to create a dialect of English for Singapore, he could create a user defined language called "English (Singapore)" that may be based on "English (United Kingdom)" which is a Windows® defined language. Similarly, for languages like English in the United States and English in the United Kingdom, i.e., differ dialect situations, a lot of phrases are the same and do not need to be translated. Thus, the only phrases translated are those phrases that differ from each other in accordance with the dialect. In this case, this is also a Windows® defined language.

The methodology of entering translations is simpler than entering the original phrase. There is no requirement that the phrase names or variable names must be entered. Initially, a check for comments is made and if the creator of the phrases has entered "comments," that information is also used in deciding how to translate the phrase. If a maximum size has been specified for the phrase, then the translation can not exceed the maximum. If more characters are required than the maximum, then exceptions need to be coordinated with the originator of the database.

In the case where phrases are translated that contain variables, the variable name must be the same as the original. For variables that have different names, the order can be changed if required. Thus, an example of this implementation is shown by the following two phrases.

"Your [/TS ProductName] balance is [/TA Amount]"

In this case, there are two variables, i.e., Product Name and Amount. The phrase can be translated to mean.

"You have [/TA Amount] in your [/TSProductName]".

Thereafter, the database is merged and exported at step 25 in a manner similar to the merge and export step 15 conducted at the source. The only difference is that in this case the database will contain two or more languages. Using an export utility, the runtime database is then created and the languages required for the runtime database must be selected. Testing is then conducted at step 27 in a manner similar to step 17 at the source which is shown at FIG. 1.

Figures 4, 5, 6:
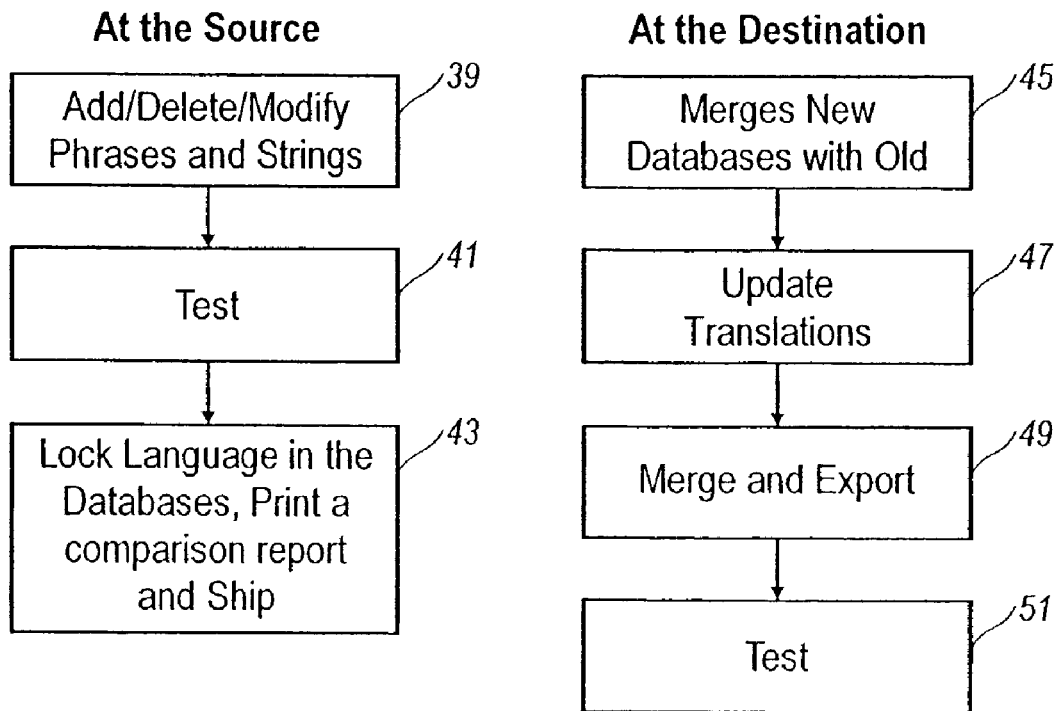
FIG. 4 is a flow diagram showing how the database in the first language can be modified at the source.
FIG. 5 is a flow diagram showing how the translated database can be modified at the destination.
FIG. 6 is a table listing the languages and countries which the system in accordance with the invention might be used to support.

As further shown in FIGS. 4 and 5, as application development progresses for the applications using the databases, it may be necessary to change existing phrases or add more phrases to the databases. A compare utility is used to compare new databases with those shipped earlier. A report of phrases and strings that were added, modified and/or deleted is then generated so that the databases at the destination can be updated. In this regard, it is important to appreciate as shown in FIGS. 4 and 5, that a comparison is done on the same language and not between two languages. At the source, as shown in FIG. 4, at step 39 phrases and strings can be added, deleted or modified. Thereafter, testing is conducted at a step 41 as discussed previously with respect to creation of the original database. If testing is successful, the language in the database is locked at step 43 along with a comparison report being printed for shipment.

As shown in FIG. 5, at step 45 the new databases are merged with the old databases and the translations are updated at a step 47. Merging and export is then conducted at step 49 as previously discussed, with subsequent testing being conducted at step 51.

In more specific detail, when a new shipment of a modified database is received at the destination, the translated language database must be merged with it. After the merge, a comparison report can be used to determine the changes for generating translations of the newly added phrases, checking of the modified phrases to find out if the translation needs to be modified, and removing any phrases from the language database that had been deleted from the original.

Figure 11:
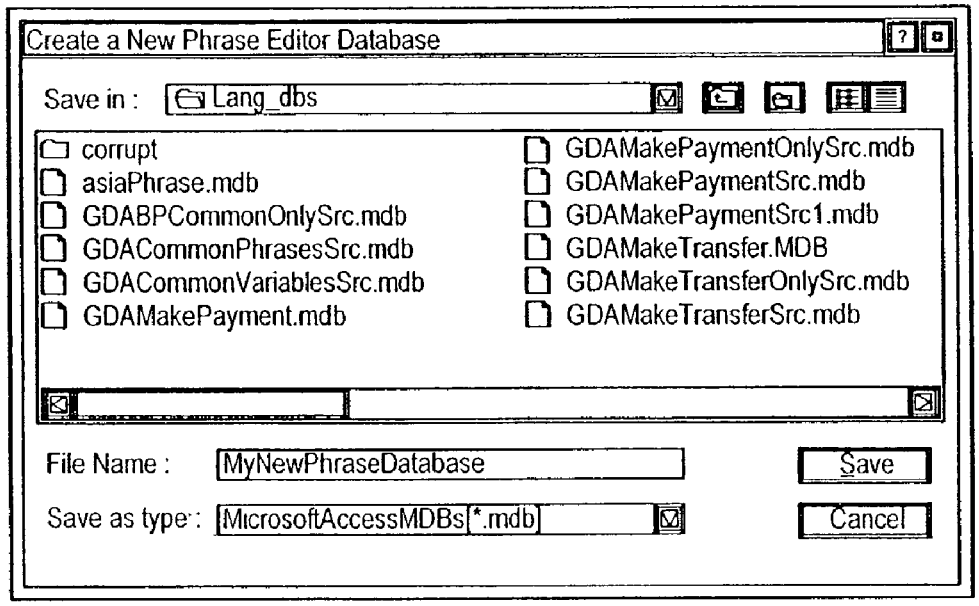
FIG. 11 illustrates a system window for creating a new database.

The system includes a phrase editor which is a tool to create a phrase database, open a phrase database, define all the elements in the phrase database, enter phrases and strings in the phrase database and export the phrase database. FIG. 11 shows a sample screen of a phrase editor window which is used to create a new database.

The phrase editor uses MDI windows that can be accessed at the same time for certain functions. The types of MDI windows available in the phrase editor are: 1) phrase and string scroll and sort, 2) editing window used to created new phrases and strings, 3) phrase display and edit window, 4) string display and edit window, 5) a variable display and edit window, and 6) a composite phrase display window which shows composite phrases with the string values substituted for the string variables. The phrase editor uses modal forms for certain functions that must be handled before interacting with any other forms. The modal forms include: 1) the display options form, 2) the define applications form, 3) the define languages form, 4) the define media/formats form, 5) the define devices form, 6) the define business codes form, 7) the define locks form. The phrase editor also includes modal forms for: 1) finding and filtering text, 2) searching and replacing text, 3) copying phrases and strings from one language to another, 4) moving phrases and strings from one language to another, and 5) deleting phrases and strings from a language.

Figure 12:
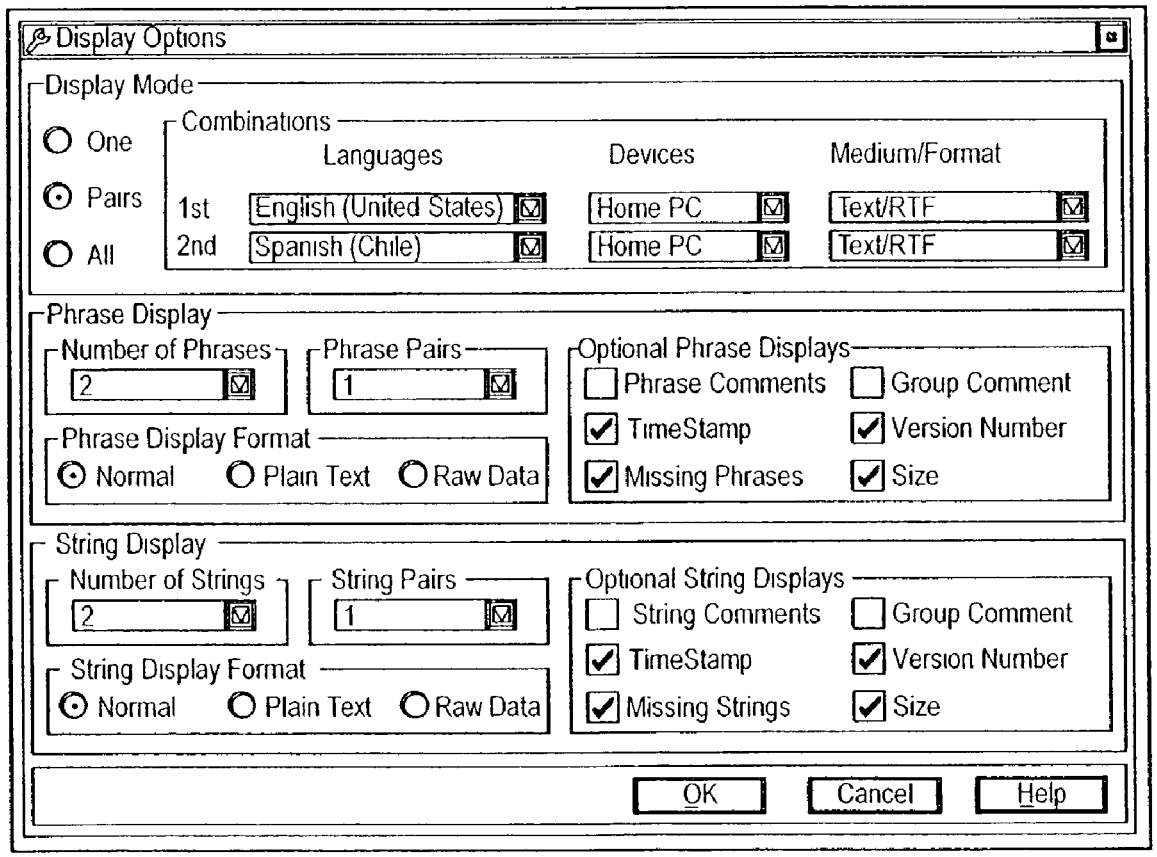
FIG. 12 illustrates a sample display options window.

A display option window as shown in FIG. 12 can be used to configure the phrases and strings window. The window can be set up to display phrases or strings in one language, two languages or all languages supported. The display device can also be selected as well as the medium format, i.e., in this case shown as text/RTF in FIG. 12.

In using the system, the display mode can be configured. There are three display modes. A first display mode is a combination of language, phrases (or strings) for the selected language, device, and medium to be displayed. A second display mode is the pairs option, in which a user can choose any combination of two languages, devices, and media. In the third display mode which is the "all" option, the user can choose to display one phrase in all languages or for all devices or all media. Similarly, the phrase display can be configured to display phrases in three manners. For example, the user can choose how many phrases or pairs of phrases a window will display by selecting a number either by the number of phrases or phrase pairs dropped/list. The maximum number of phrases is six and the maximum for phrase pairs is three.

In addition, the phrase display format can be selected. The phrases are stored in the database in two formats, RTF/UTF-7 and plain (code page) text and normally, the text is rendered from the RTF/UTF-7 format before it is displayed in the phrase or string windows. This is called Normal Mode. A user may choose to view the plain text version by selecting the plain text mode or see the RTF/UTF-7 version by selecting the raw data mode. Yet still further, optional phrase display allows for phrase comments, group comment, time stamp, version number, missing phrases or size to also be displayed on a phrase window.

Similarly, the string display section has three sections. A first string display allows selection of how many strings or pairs of strings a string window will display by selecting a number either from the number of strings or string pairs drop-down list in the string display pane. The maximum number of strings is six and the maximum number for string pairs is three. The string display format option addresses the fact that strings are stored in the database in two formats, RTF/UTF-7 and plain text. Normally, the text is rendered from the RTF/UTF-7 format before it is displayed in the MDI window. This is called the Normal Mode. A user may choose to view the plain text version by selecting a Plain Text mode or view the RTF version by selecting a Raw Data mode. Finally, it is also possible to set string comment, group comments, time stamp, version number, missing strings or size for display on the string window.

FIG. 13 shows an example of a variables window which is used to create variables. The lower pane of the variables window is used to select a variable type and enter the variable name. Existing variable types and their names are displayed on the upper grid.

Figure 14:
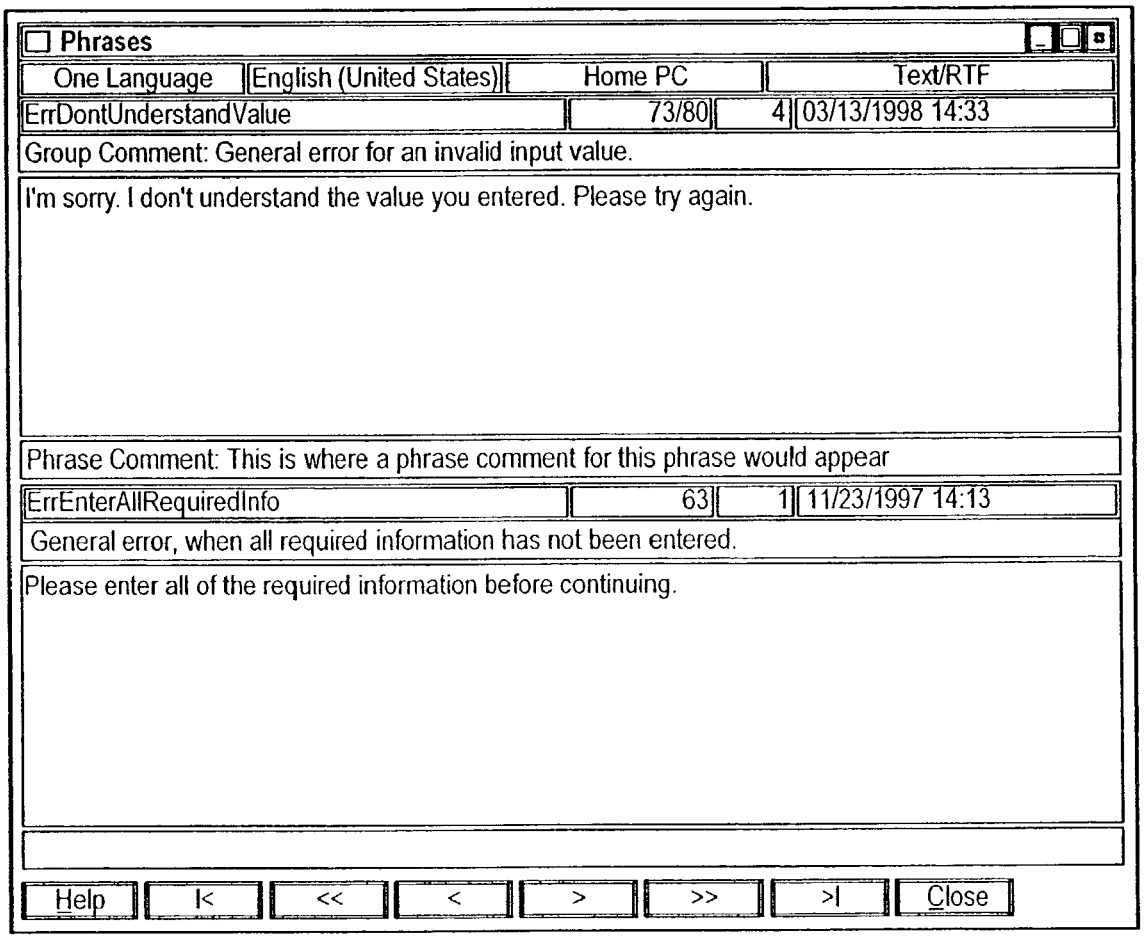
FIG. 14 illustrates a window which displays phrases on the database.

A separate phrases window displays phrases in the database. This is illustrated by the window shown in FIG. 14. As can be seen in FIG. 14, the top line shows the display mode, language, device, and media format. The second line shows the phrase name and size, version, and timestamp. The group comment is on the third line, the phrase is on the fourth line. The phrase comment is on the fifth line.

By using the display options, the user can configure the phrase window to display from one to six phrases at a time. Each phrase will be in its own window pane. The borders of each phrase window has labels that show the language, device, and media/format of the phrase. Each phrase pane represents a phrase defined by a unique combination of four properties, i.e., phrase name, language, device, and media/format.

Figure 15:
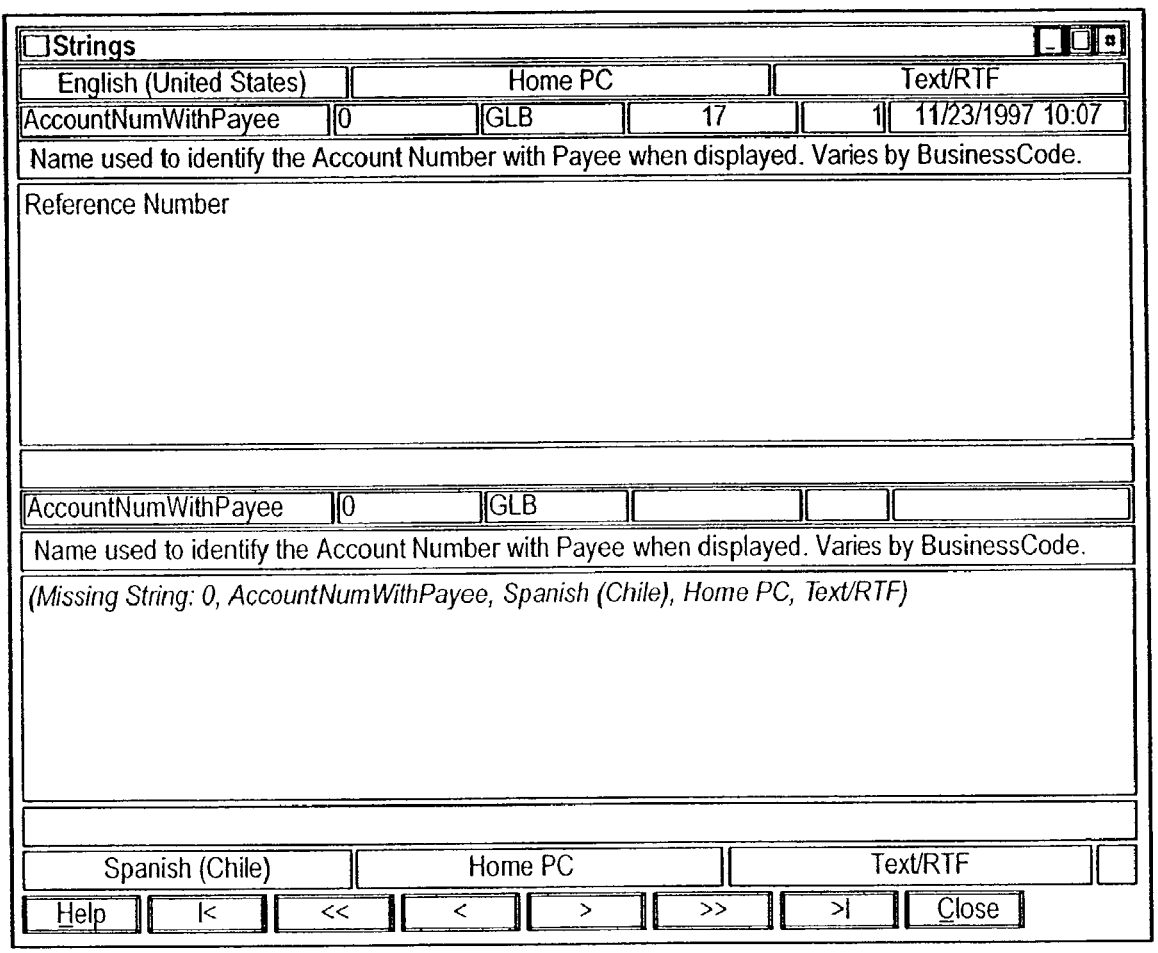
FIG. 15 illustrates a window which displays strings in a matter similar to the window that displays phrases.

The strings window is similar to the phrases window as is shown in example form in FIG. 15.

Figure 16:
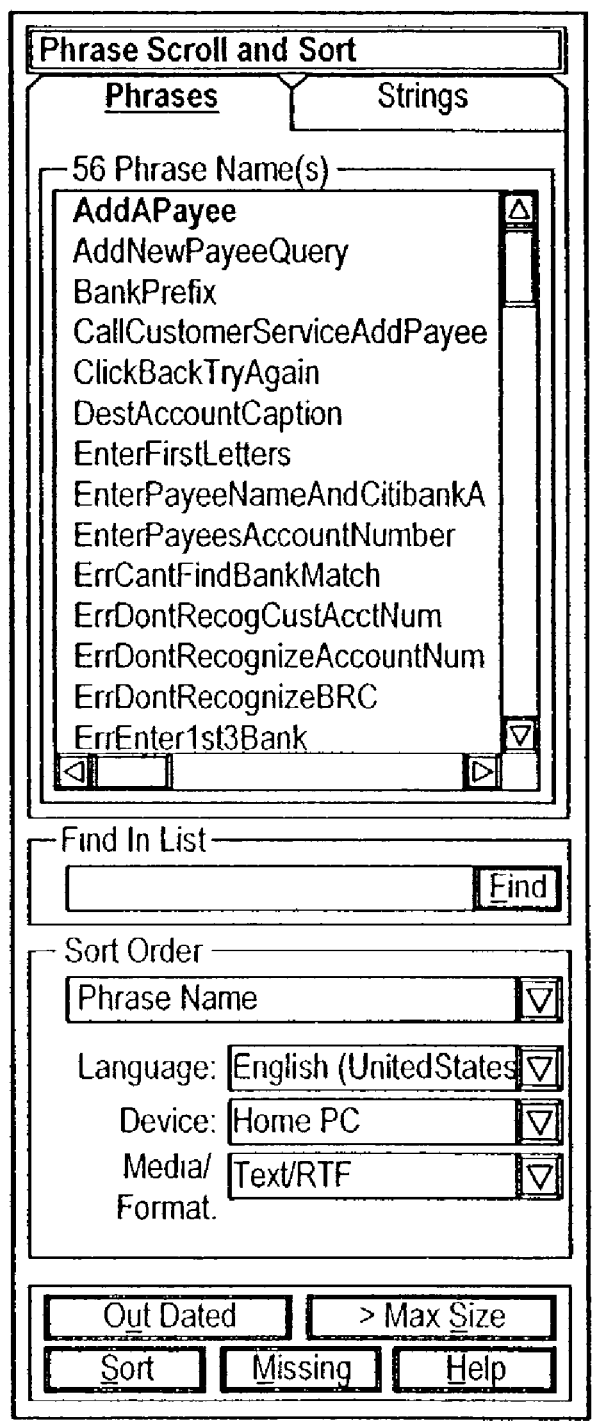
FIG. 16 illustrates a window which is used to navigate through the phrases or the strings, or the entire database.

A Phrase Scroll and Sort Window as show in FIG. 16 can be used to navigate through the phrases (or the strings) or the entire database. For example, as will be readily apparent from FIG. 16, phrases can be sorted by phrase name and phrase text or the strings can be sorted by variable names/string value ID pair and string text. In accordance with the invention, a user can search for specific phrase name, phrase text, variable name/string value ID, or string text by using the Find In List box.

Figure 17:
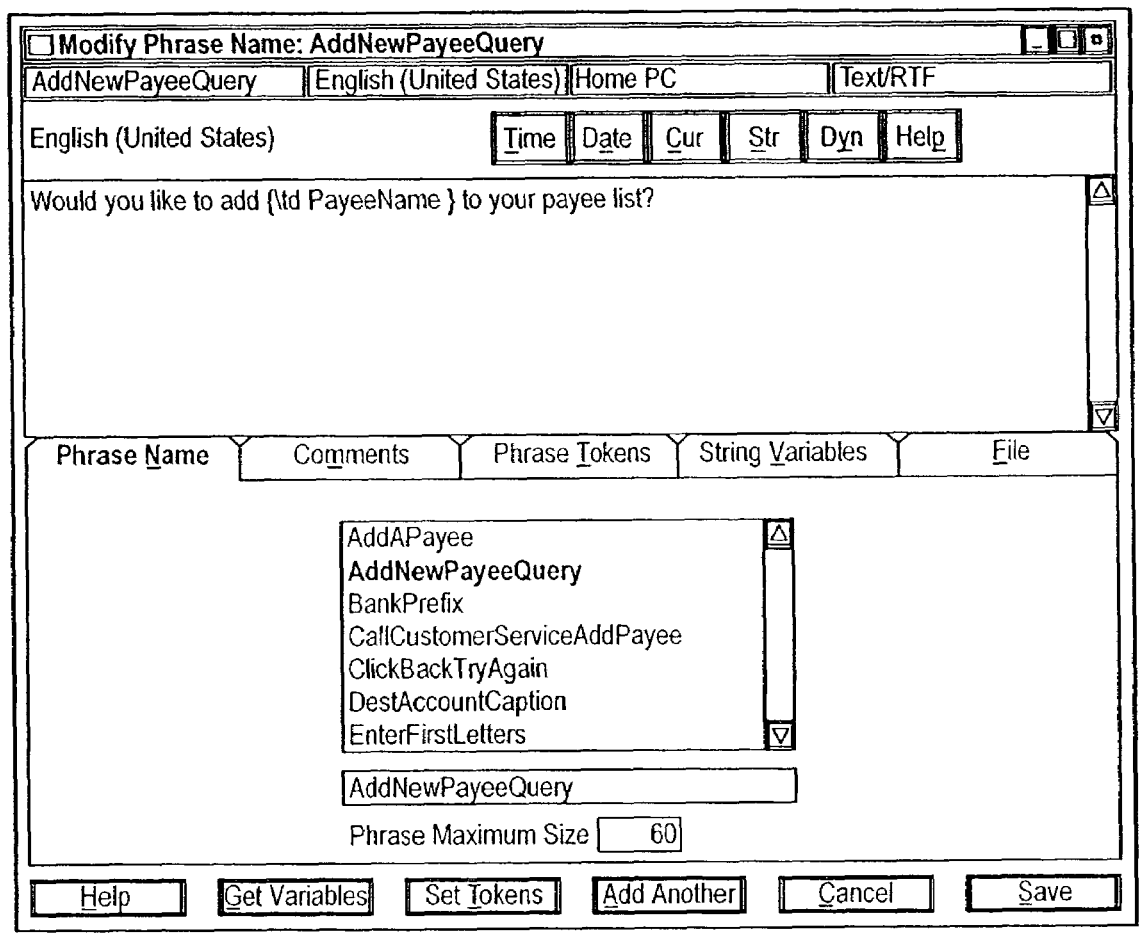
FIG. 17 illustrates a window used for editing.
Figure 18:
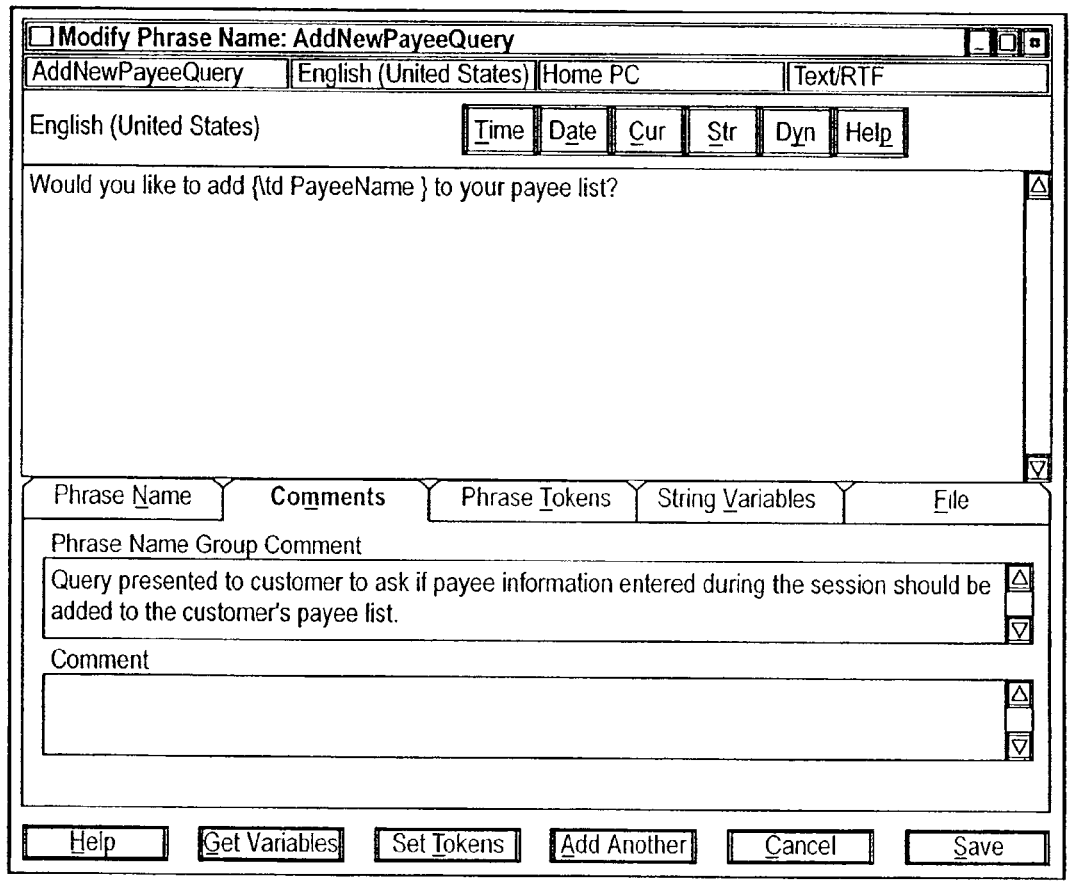
FIG. 18 illustrates a window which is used to enter comments for either phrases or strings, depending upon which is being edited.
Figure 19:
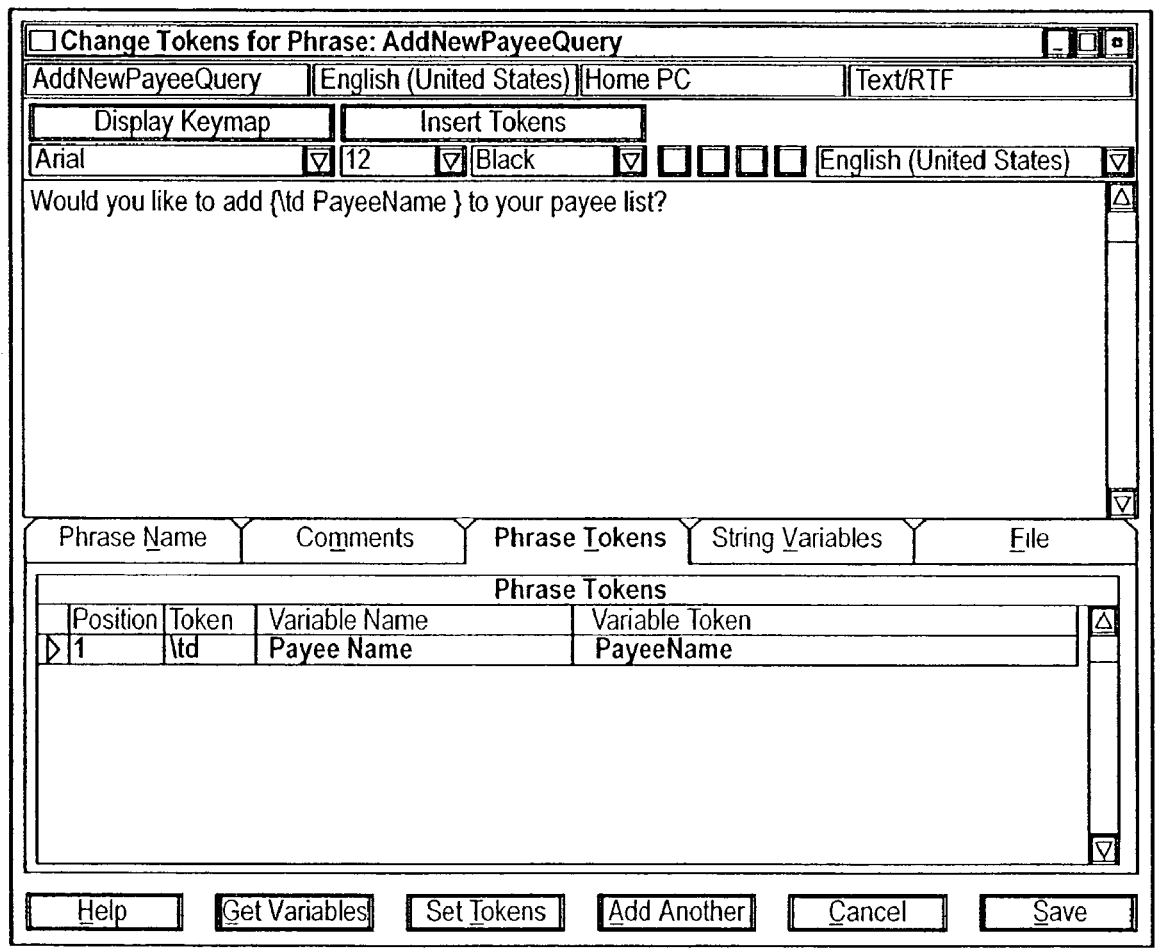
FIG. 19 shows a window which is used to assign variable names to the variable tokens for entering text.

FIG. 17 illustrates a typical edit window which includes five tabs, one tab for each of its five different functions. A phrase name tab is used to enter the phrase name, phrase maximum size and phrase text when a new phrase is created. This tab is also used to modify the phrase name or phrase maximum size. A comment tab is used to enter comments for either phrases or strings depending on which one is being edited and is more clearly showed in FIG. 18. A phrase token tab is shown in FIG. 19 and is used to assign variable names to the variable tokens in the phrase text.

Figure 20:
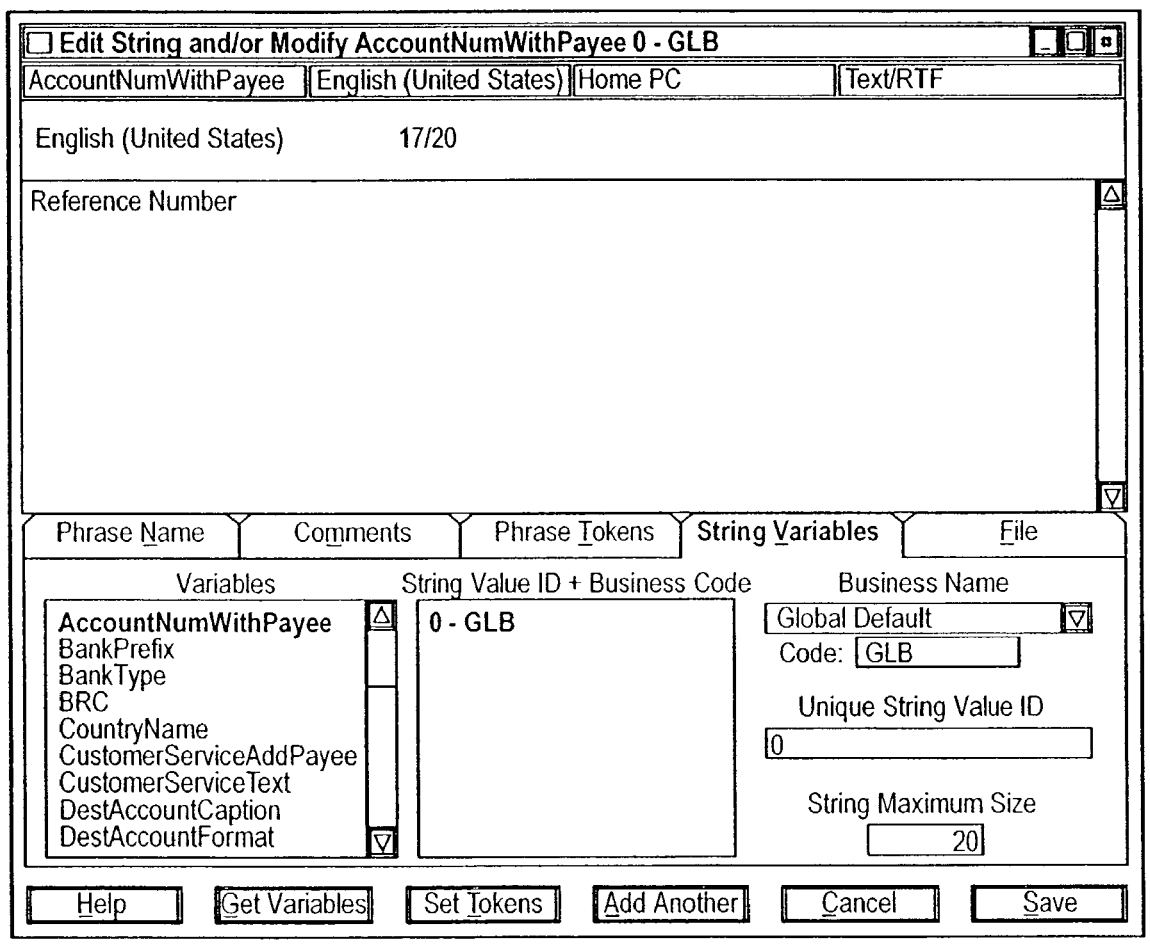
FIG. 20 illustrates a window used to enter the string value ID, string maximum size and string text when a new string is created.
Figure 21:
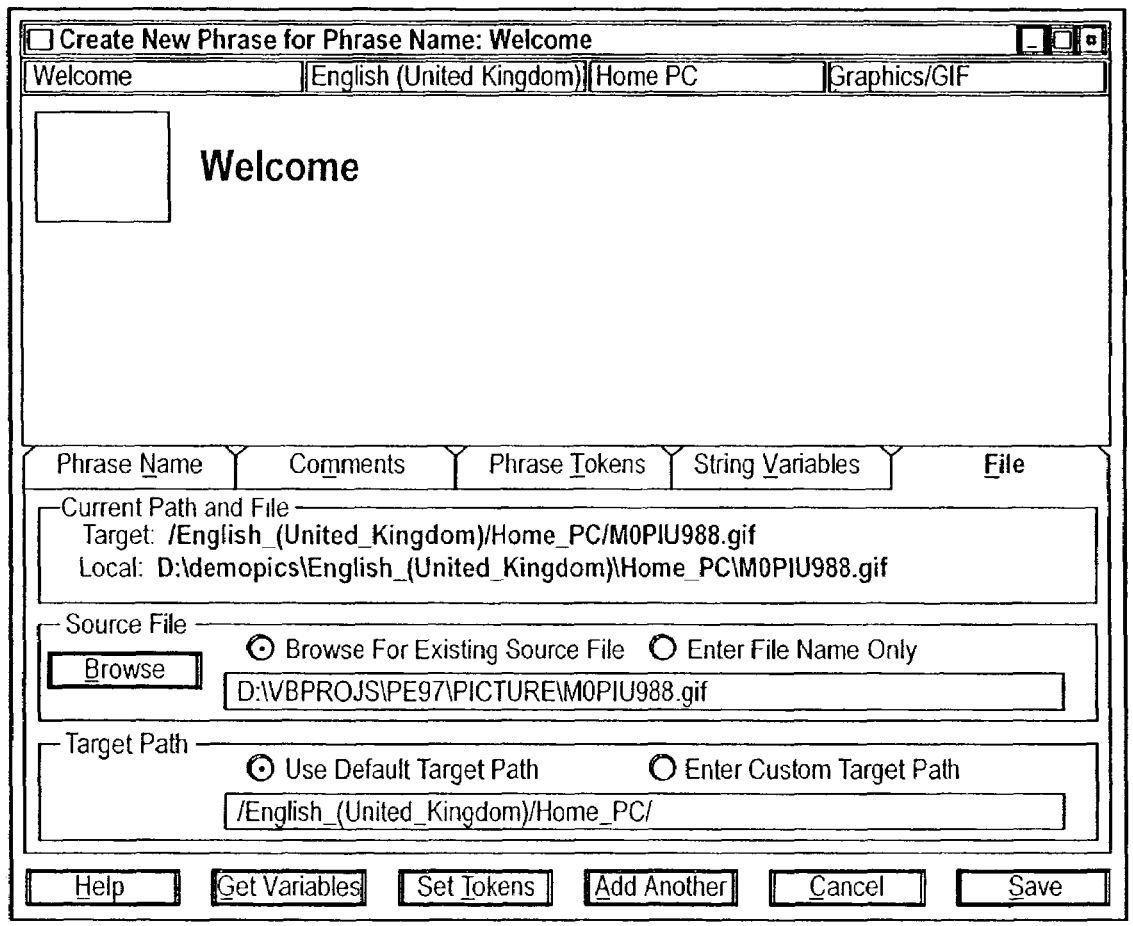
FIG. 21 illustrates a window used to assign a media file to a phrase or string with a graphic media format.

The string variables tab more clearly illustrated in FIG. 20 is used to enter the string value ID, string maximum size and string text when a new phrase is created. This tab is also used to modify the string value ID and string maximum size. FIG. 21 illustrates the file tab which is used to assign a media file to a phrase or string with a graphic media format.

As noted previously, a feature of the system is that one or more languages in the database may be "locked." The purpose of this is to prevent accidental modification of phrases or strings in the locked language when translations are done in other languages. It is possible to lock or unlock a language when using the system.

The general features and function of the system having been described, it will be appreciated that the specific implementation through window "point and click" techniques can take many forms and be implemented in a routine and conventional manner by those of ordinary skill in the art.

Having thus generally described the invention, the same will become better understood from the appended claims in which it is set forth in what is intended to be a nonlimiting matter.

What is claimed is:

1. A method for making a database stored upon a computer readable medium used with a computer for use as a computerized multilingual phrase database in a runtime application environment, for translating words, phrases and variables into words, phrases and variables in at least a second language, comprising:

creating all application phrases in one language, reserving a variable placeholder in the application phrase for each variable in the phrases, and storing the application phrases in one language which is supported by the Windows® 2000 operating system, in a first phrase database;

creating translations of the created application phrases in the one language into at least another language which is supported by the Windows® 2000 operating system and storing the translated phrases in at least a second phrase database;

creating the first phrase database and the at least a second phrase database of phrases as common phrase databases of phrases common to all applications with which the phrases are to be used;

creating at least a first application specific phrase database and at least a second application specific database made up of translations of the at least a first application specific phrase database only for applications which will use the phrases in the at least a first application specific phrase database and at least a second application specific database; and exporting the created first common phrase database, at least a second common phrase database, the first application specific phrase database, and at least a second application specific phrase database in a form that can be used in a runtime environment by an application for which the databases were created.

2. The method as in claim 1, wherein the application phrases for all different languages are stored in a universal format.

3. The method as in claim 2, wherein said universal format is UTF-7.

4. The method as in claim 1, wherein said exporting step further comprises converting the format of the phrases stored into native format or UTF-8 format.

5. The method as in claim 3, wherein said exporting step further comprises converting the UTF-7 format stored phrases into native format or UTF-8 format.

6. A method as in claim 1, further comprising merging the common phrase databases and the application specific databases for runtime use with an application.

7. A method as in claim 1, further comprising reserving spaces for variables in stored phrases in the databases.

8. A method as in claim 1, further comprising creating said at least a first database in a first dialect of a first language, and creating said at least a second database in a second dialect of the first language to be comprised only of those phrases in the second dialect which differ from the first dialect.

9. A method as in claim 1 wherein said first phrase database is created in English.

10. A method as in claim 1 wherein said second phrase database comprises a plurality of databases created respectively in each of the languages supported by the Windows® 2000 operating system.

11. A method as in claim 10 wherein said second phrase database comprises a plurality of databases created respectively in Chinese, Dutch, German, Greek, French, Italian, Korean, Catalan, Spanish and Japanese.

12. A method as in claim 1 further comprising creating a graphical user interface for displaying the phrases.

13. A method as in claim 1 further comprising exporting the databases in batch mode for use in a runtime environment by an application.

14. A method as in claim 1 further comprising periodically updating the databases with additional phrases to be used by applications in a runtime environment.

15. A method as in claim 1, wherein the phrases in the first phrase databases and in the at least a second phrase database are stored in RTF/UTF-7 format and in plain (code page) text, and further comprising rendering the text of phrases from the RTF/UTF-7 format.

16. A method as in claim 1, wherein the phrases in the first phrase database and in the at least a second phrase database are stored in RTF/UTF-7 format and in plain (code page) text.

17. A method as in claim 1, wherein said phrases are multimedia phrases comprised of graphic-image files, and further comprising defining the phrase medium/format of said graphic-image files as one of Graphics/GIF and Graphics/JPG.

18. A method as in claim 17, wherein the path and file name of the graphic-image file are stored for access and displaying the graphic-image files.

19. A database system for use with a computer as a multilingual phrase database in a runtime application environment, for translating words, phrases and variables into words, phrases and variables in at least a second language comprising:

a first database created and stored which comprises all application phrases in one language which is supported by the Windows® 2000 operating system, and variable place holder in each phrase that includes a variable;

at least a second database created and stored which comprises translations of the application phrases in the first database into at least one other language which is supported by the Windows® 2000 operating system; and said first database and said at least a second database comprise common phrase databases of phrases common to all applications with which the database system is to be used;

at least a first application specific phrase database and at least a second application specific database made up of translations of the at least a first application specific phrase database only for applications which will use the phrases in the at least a first application specific database and the at least a second application specific database; and said first common phrase database, said at least a second common phrase database, said first application specific phrase database, and at least a second application specific phrase database having been exported and stored in a form in which the databases can be used in a runtime environment by an application for which the databases were created.

20. A database system as in claim 19, wherein the phrases stored in the first and at least a second database are stored in a universal format.

21. A database system as in claim 20, wherein said universal format is UTF-7.

22. A database system as in claim 19, wherein the first application specific phrase database and at least a second specific phrase database are stored in native format or UTF-8 format after having been exported.

23. A database system as in claim 21, wherein the first application specific phrase database and at least a second specific phrase database are stored in native format or UTF-8 format after having been exported.

24. A database system as in claim 19 wherein the common phrase databases and the application specific databases are merged for runtime use with an application.

25. A database system as in claim 19 wherein the stored phrases in the databases further comprise reserved spaces for variables in stored phrases in the databases.

26. A database system as in claim 19 wherein the first database comprises phrases in a first dialect of a first language, and the at least a second database comprises only phrases in a second dialect of the first language which differ from the first dialect.

27. A database system as in claim 19, wherein said second phrase database comprises a plurality of databases created respectively in each of the languages supported by the Windows® 2000 operating system.

28. A database system as in claim 19 wherein said first phrase database is in English, and said at least a second phrase database comprises a plurality of databases, each one respectively in Chinese, Dutch, German, Greek, French, Italian, Korean, Catalan, Spanish and Japanese.

29. A database system as in claim 19 further comprising mean for generating a graphical user interface for displaying the phrases.

30. A database system as in claim 19 wherein said database have been exported in batch mode for use in a runtime environment.

31. A database system as in claim 19 further comprising means for periodically updating the databases with additional phrases.

32. A database system as in claim 19 further comprising means for creating user defined languages.

33. A database system as in claim 19 further comprising means for presenting the translated phrases in at least one of graphic images, audio and other multi-media.

34. A database system as in claim 19 further comprising means for creating the translations in the same language as the first in a manner configured for supporting display devices with different display capabilities.

35. A database system as in claim 19, wherein the phrases in the first phrase database and/or the at least a second phrase database are stored in RTF/UTF-7 format and in plain (code page) text, and the database register being further configured for rendering the text of phrases from the RTF/UTF-7 format.

36. The database system as in claim 19, wherein the phrases in the first phrase database and in the at least a second phrase database are stored in RTF/UTF-7 format and in plain (code page) text.

37. The database system as in claim 19, wherein said phrases are multimedia phrases comprised of graphic-image files, and wherein the phrase medium/format of said graphic-image files have been defined as one of Graphics/GIF and Graphics/JPG.

38. The database system as in claim 37, wherein the path and file name of the graphic-image file have been stored for allowing accessing and displaying of the graphic-image files.

* * * * *